United States Patent
Patel et al.

[11] Patent Number: 5,761,808
[45] Date of Patent: Jun. 9, 1998

[54] METHOD OF MAKING A HEAT EXCHANGER

[75] Inventors: Ramchandra L. Patel, Southgate; Eugene Rhodes, Belleville, both of Mich.

[73] Assignee: Ford Motor Company, Dearborn, Mich.

[21] Appl. No.: 739,636

[22] Filed: Oct. 30, 1996

[51] Int. Cl.[6] .................................................. B23P 15/26
[52] U.S. Cl. ............................. 29/890.52; 29/890.53; 29/890.54
[58] Field of Search ................. 29/890.52, 890.53, 29/890.54; 228/183; 165/173, 176

[56] References Cited

U.S. PATENT DOCUMENTS

| | | | |
|---|---|---|---|
| 2,064,036 | 12/1936 | Sandberg | 165/149 |
| 2,867,416 | 1/1959 | Lieberherr | 165/173 |
| 3,557,596 | 1/1971 | Esseluhn et al. | 72/367 |
| 4,002,198 | 1/1977 | Wagner et al. | 165/176 |
| 4,770,240 | 9/1988 | Dawson et al. | 29/890.52 |
| 4,917,180 | 4/1990 | Wolf et al. | |
| 5,090,477 | 2/1992 | Sprow et al. | |
| 5,172,761 | 12/1992 | Lyon | |
| 5,190,101 | 3/1993 | Jalilevand et al. | |
| 5,363,911 | 11/1994 | Velluet et al. | 29/890.52 |
| 5,402,571 | 4/1995 | Hosoya et al. | 29/890.52 |
| 5,481,800 | 1/1996 | Hutto et al. | 29/890.52 |
| 5,579,837 | 12/1996 | Yu et al. | 29/890.53 |

FOREIGN PATENT DOCUMENTS

| | | |
|---|---|---|
| 63-189791 | 8/1988 | Japan . |
| 63-279094 | 11/1988 | Japan . |
| 4-161797 | 6/1992 | Japan . |

*Primary Examiner*—Irene Cuda
*Attorney, Agent, or Firm*—Raymond L. Coppiellie

[57] ABSTRACT

A method for making a manifold for a tube and fin type heat exchanger wherein the manifold is a one piece aluminum extrusion. The manifold includes a U-shaped channel having a base member and a pair of vertical walls, a plurality of fluid conducting passageways in the base member, and a pair of hollow longitudinal fluid conduits. The conduits are then crimped at predetermined locations to form fluid baffles and the manifold is then sealed. The baffles include slits which allow a bonding agent to secure the baffle within the fluid conduit.

12 Claims, 3 Drawing Sheets

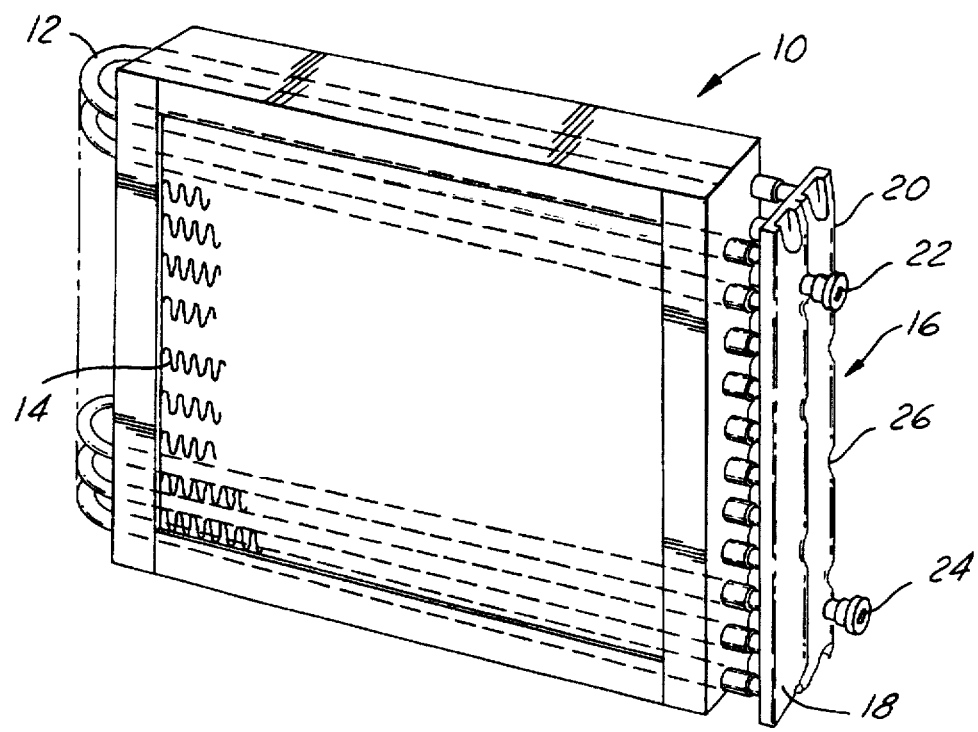
FIG. 1
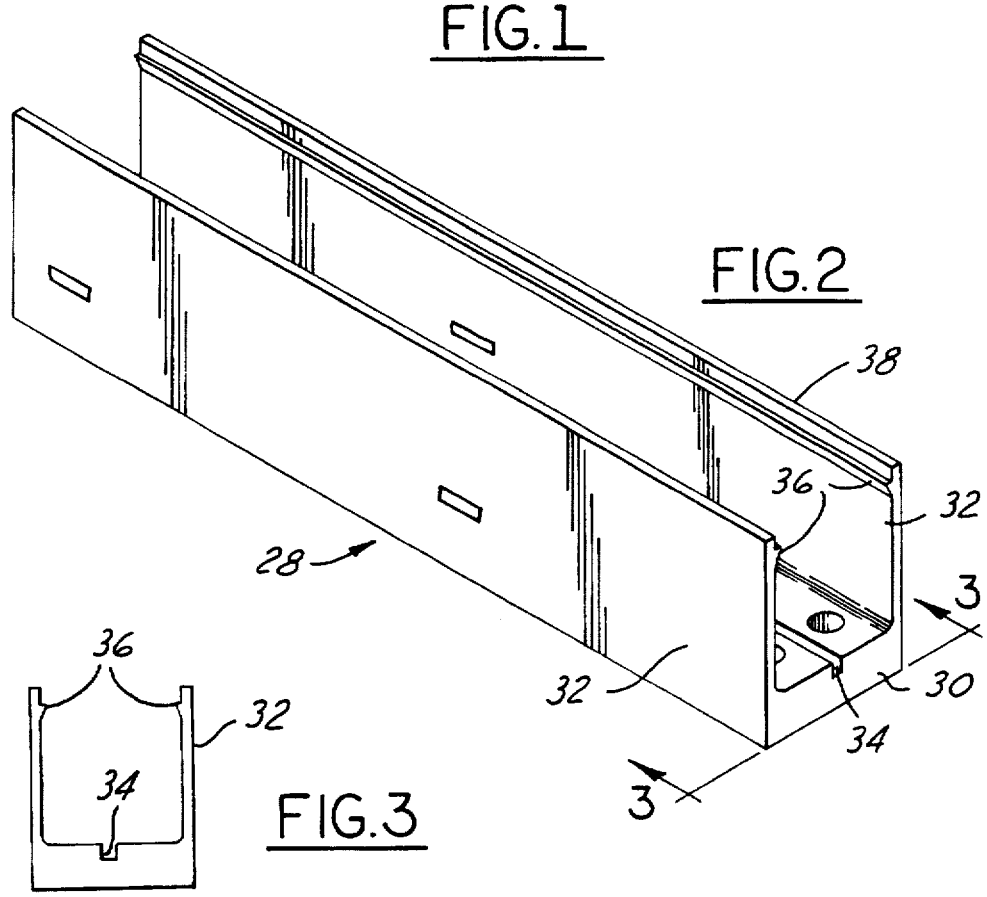
FIG. 2
FIG. 3

1
METHOD OF MAKING A HEAT EXCHANGER

BACKGROUND OF THE INVENTION

This application is related to copending Ford patent applications "Heat Exchanger Manifold", Ser. No. 08/739,562 and "A Baffle For A Heat Exchanger, Ser. No. 08/739,558 each having the same inventors and filing date as the present application.

1. Field of the Invention

The present invention relates generally to manifolds for heat exchangers such as condensers, evaporators and oil coolers used in automotive vehicles. More particularly, the present invention relates to a method for making a manifold for use in a fin and tube type heat exchanger wherein the manifold includes an internal, integrally formed baffle.

2. Disclosure Information

Fin and tube type heat exchangers are commonly used in vehicle, industrial and residential environments for heating and cooling purposes. Typically, these heat exchangers utilize a plurality of tubes to form a condenser or the like by having the fluid pass through the tubes. The number of tubes utilized depends on the thermal capacity requirements of the fin and tube heat exchanger. In order to connect these tubes together so that the fluid can flow through the tubes, manifolds are used having a series of openings corresponding to and mating with the ends of the tubes. The manifolds have an inlet port and an outlet port which circulate the fluid through the heat exchanger and then returns the fluid to a remote location for subsequent recycling.

It is known in the art to fabricate manifolds having holes or flanges for receiving the tubes from a seamless tube in which the holes are punched and the flanges formed with a die. It is also known to manufacture manifolds having extensions for receiving the tubes using at least two pieces of material. The extensions are formed in a pressing operation from a piece of sheet metal, or by brazing or otherwise securing short, seamless, tubular extensions to holes in a larger tube, or from a bending operation in which half of each of the tubular extensions is formed from a piece of sheet metal which also forms half of the main body of the manifold. The two halves are then welded or otherwise secured together.

In multipass heat exchangers, the heat exchanger fluid makes multiple passes through the heat exchanger to increase its efficiency. These multiple passes are accomplished by obstructing the fluid flow at key locations and forcing the fluid across the heat exchanger. Typically, the obstructions are baffles placed within the manifold. Several methods are known for placing baffles within a manifold. In one method, a circular disk of material is place within a predefined aperture in the manifold and bonded there. In another method, such as disclosed in U.S. Pat. No. 5,090,477 a baffle is mechanically formed by crimping the manifold so that one portion of the manifold wall contacts an opposite portion of the manifold wall. The '477 patent teaches that because of the plastic deformation of the manifold wall, a leak tight seal is formed and brazing is not required further secure the baffle within the manifold. However, if the manifold is used on a heat exchanger requiring extremely high internal pressures, the baffle may leak. Therefore it would be advantageous to provide a manifold with an internally formed baffle that can withstand high pressures.

It is a feature of the present invention that manifolds with internally formed baffles can withstand higher operating pressures with no leaking.

2
SUMMARY OF THE INVENTION

The present invention overcomes the difficulties and deficiencies associated with prior art devices by providing a method of making a manifold for a heat exchanger, the method comprising the steps of extruding a piece of plastically deformable material into a longitudinal U-shaped channel having a generally planar base member and a pair of vertically depending walls projecting generally perpendicularly to the plane of the base member; forming a plurality of fluid conducting passageways in the base member; and rolling the vertical walls toward the longitudinal center of the base member until the free ends of the walls contact the base member so as to form a pair of hollow longitudinal fluid conduits. The method further comprises the steps of forming a baffle in at least one of the longitudinal fluid conduits by plastically deforming a top wall of at least one of the fluid conduits until the top wall abuts a bottom wall of the fluid conduit and bonding the top wall to the bottom wall thereat, the step including providing a slit in the top wall and causing a bonding material to flow therethrough. The method provides the advantages of a stronger bond strength at the baffle, thus increasing the burst strength of the manifold.

It is an advantage of the present invention that a dual conduit manifold can be manufactured with integral, internal baffles.

These and other objects, features and advantages of the present invention will become apparent from the brief description of the drawings, detailed description, and claims which follow:

BRIEF DESCRIPTION OF THE DRAWINGS

FIG. 1 is a perspective view of a tube and fin heat exchanger including a manifold structured in accord with the principles of the present invention.

FIG. 2 is a perspective view of an extruded U-shaped channel member for use with the process of fabricating a manifold according to the method of the present invention.

FIG. 3 is a cross-sectional view of the U-shaped channel member of FIG. 2 taken along line 3—3.

DETAILED DESCRIPTION OF THE PREFERRED EMBODIMENTS

Figure 4:
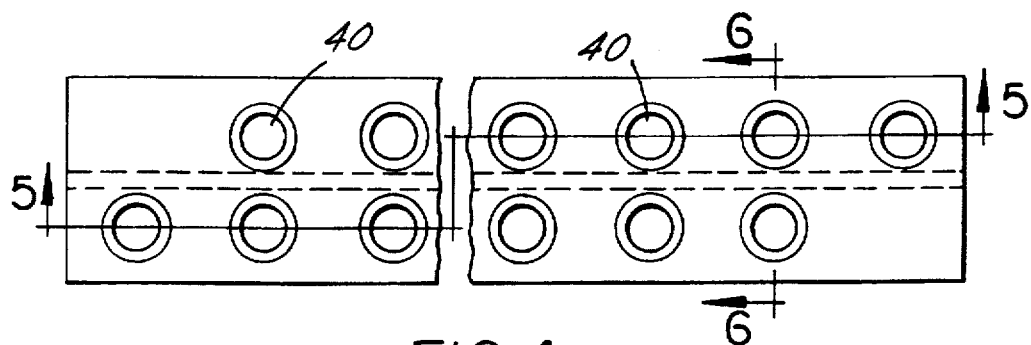
FIG. 4 is an elevational view of one embodiment of a manifold structured in accord with the principles of the present invention.

Referring now to the drawings, FIG. 1 shows a tube and fin type heat exchanger 10 including a plurality of U-shaped tubes 12 with heat dissipative fins 14 interposed between each of the tubes 12. The free ends of the U-shaped tubes 12 matingly engage a manifold 16 disposed at one end of the heat exchanger 10. As shown in FIG. 1, manifold 16 is a double chambered manifold having a first fluid conduit 18 and a second fluid conduit 20. First fluid conduit 18 includes an inlet port 22 for receiving fluid therein and fluid conduit 20 includes an outlet port 24 for discharge of fluid therefrom. As will be explained more fully below, manifold 16 further includes a plurality of integrally formed, crimped baffles 26 for directing fluid through the heat exchanger according to a predefined pathway. In accordance with principles well known in the heat exchanger art, fluid to be cooled (or heated) enters manifolds 16 through inlet port 22 and is directed through the plurality of U-shaped tubes 12 wherein the fluid is cooled by a secondary fluid, such as air, passing over the fins 14. The baffles 26 and the manifold 16 direct the fluid through the U-shaped tubes wherein the fluid eventually discharges from outlet port 24. It should be apparent to those skilled in the art that the heat exchanger of FIG. 1 utilizes a manifold having a pair of longitudinal fluid conduits although the present invention may be utilized in conjunction with a manifold having a single fluid conduit. As shown in FIG. 1, the heat exchanger is a condenser, although the principles of the present invention can be applied to other types of heat exchangers as well.

The manifold 16 is fabricated from an extruded aluminum alloy such as SAE 3003, 3102, or 6062 or any of another of known types of deformable materials. Manifold 16 is formed according to the method of the present invention by first extruding an aluminum blank into a U-shaped channel member such as is shown in FIGS. 2 and 3. The U-shaped channel member 28 is an elongated member having a generally planar base 30 with a pair of vertical walls 32 depending generally perpendicularly to the plane of the base. The base 30 includes a U-shaped slot 34 running the longitudinal length of the channel member 28 approximate medially to the longitudinal axis of the channel member 28. Each of the vertical walls 32 includes an inwardly extending flange 36 disposed near the free ends 38 of the walls. As can be seen in FIG. 3, the inwardly extending flanges 36 are angled away from the plane of the base member 30 of channel 28 for reasons which will become apparent below. The vertical walls 32 may also include slits 39 formed therein. As will be explained below, the slits 39 allow a brazing material to flow therethrough in the fabrication of the manifold.

Figure 5:
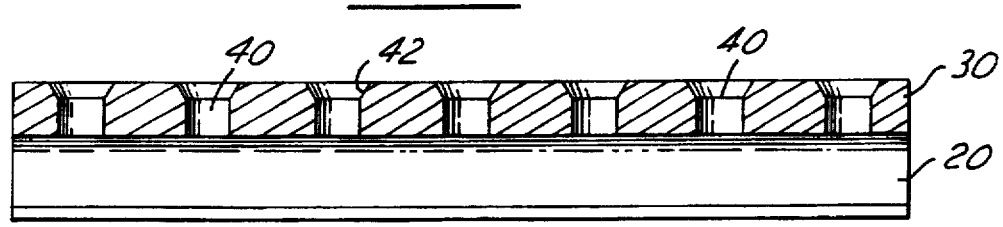
FIG. 5 is a cross-sectional view of FIG. 4 taken along line 5—5.
Figure 6:
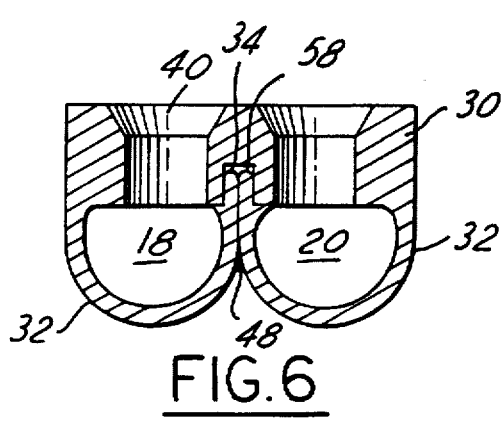
FIG. 6 is a cross-sectional view of FIG. 4 taken along line 6—6.

After the U-shaped channel member 28 has been extruded, the next step in the method of the present invention in fabricating manifold 16 is to form a plurality of fluid conducting passages in the base member 30 of channel member 28. FIGS. 4–6 show one type of fluid-conducting passageway formed in base member 30. Apertures 40 are formed by a piercing operation in base member 30. The apertures 40 have a predetermined configuration as can be seen in FIG. 5 wherein one end 42 of apertures 40 is flared. The apertures 40 communicate with the fluid conduits 18, 20 of the manifold 16. The flared ends 42 of apertures 40 receive the free ends of the U-shaped tubes 12 of the heat exchanger therein.

After the apertures 40 have been pierced into base member 30, the next step of the method of the present invention is to roll the vertical walls 32 toward the longitudinal center of the base member 30 until the free ends 38 of the walls 32 engage the U-shaped slot 34 of the base member 30 as shown in FIG. 6. The walls 32 are rolled until the inwardly extending flanges 36 contact the base member 30. The angle of the inwardly extending flanges provide a positive stop when they have engaged the slot 34.

Figure 7:
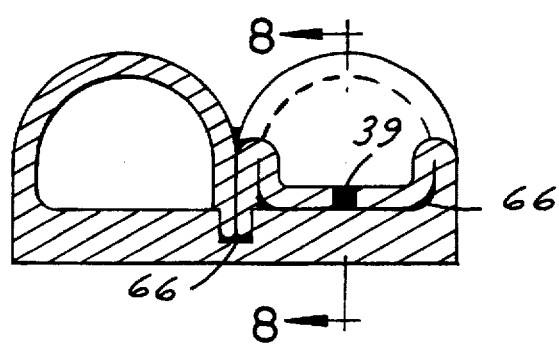
FIG. 7 is a cross-sectional view of FIG. 1 taken along line 7—7.
Figure 9:
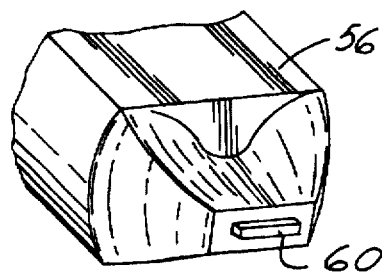
FIG. 9 is a perspective view of a tool used in fabricating a manifold in accord with the principles of the present invention.
Figure 10:
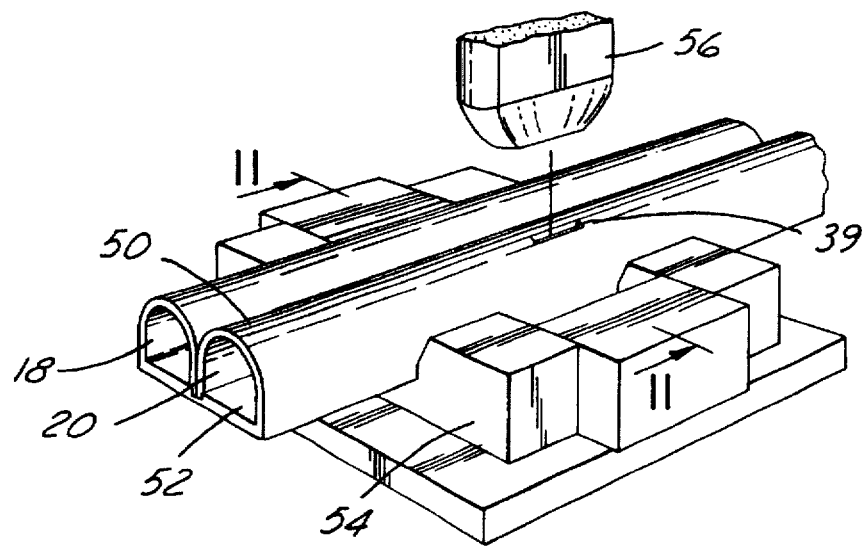
FIG. 10 is a perspective view of a tool used in fabricating a manifold in accord with the principles of the present invention.
Figure 11:
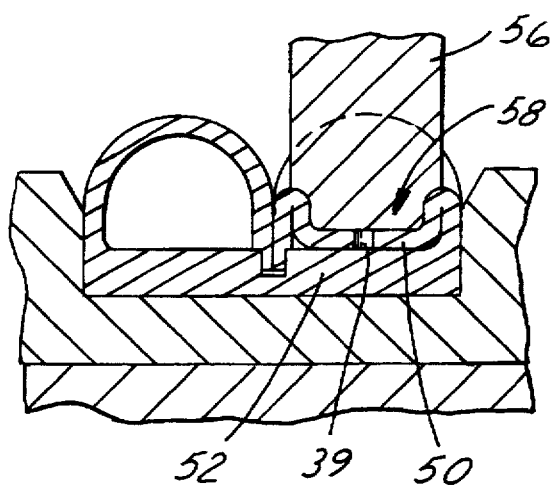
FIG. 11 is a cross-sectional view of FIG. 10 taken along line 11—11.

After the vertical walls have been rolled, the baffles 26 are then mechanically crimped into each of the fluid conduits 18, 20 according to a predefined location to achieve the desired circulation of fluid as in FIG. 6A. The crimping operation may be achieved in any of a number of known mechanical processes and one such process is shown in FIGS. 9–11. The walls 32 are rolled to form a pair of fluid conduits 18, 20, as explained above, to define an arcuate top wall 50 and a bottom wall 52. The slits 39 are on the top wall 50 of the conduits after the rolling process has been completed. The manifold is placed into a die 54 in which it is securely held. A vertically reciprocating punch 56 is forced into the top wall 50 of the conduit against the slit 39 until the punch plastically deforms the top wall 50 to the bottom wall 52 to form a depression 58. As shown in FIG. 7, the depression 58 is generally U-shaped and includes the slit 39 therein. Alternatively, the vertical walls 32 do not include the slits 39. Instead, the punch 56 includes a slit producing member 60 on its end such that when forced against the manifold top wall 50, the punch creates a slit as it plastically deforms the top wall 50. In either method, an integrally formed baffle is created.

Figure 8:
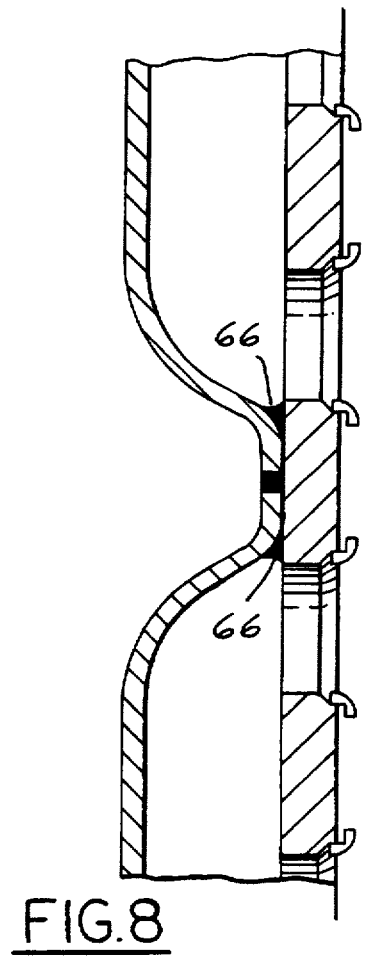
FIG. 8 is a cross-sectional view of FIG. 7 taken along line 8—8.

After the baffles have been formed and the ends of the manifold have been crimped, the manifold assembly is washed in a degreasing solution. From there, the inlet port 22 and outlet port 24 are formed and assembled to the manifold according to known manufacturing processes. The manifold is coated with a brazing material which typically includes a fluxing agent. The brazing material can be in the form of a paste or a wire which is placed along the longitudinal length of the manifold 48 and in the depressions 58. The manifold assembly is then placed in a brazing oven to form a weld seam or brazed joint along the longitudinal length of the manifold as shown at 48 in FIG. 6 between each of the fluid conduits 18 and 20. As shown in FIGS. 7 and 8, during this step, the molten flux/braze material 66 flows through the slits 39 by capillary flow to bond the top wall 50 to the bottom wall 52 of the manifold. By actively bonding the top and bottom walls together, a stronger baffle is formed than without the bonding. This increases the burst strength of the manifold over mechanical crimps alone, and reduces leakage at the baffle. The transverse ends of the fluid conduits are also sealed at this point in the process. The ends may also include a slit for the same purpose as explained above.

After the manifold has been manufactured according to the above process, the U-shaped tubes are connected to the manifold 16. The free ends of the U-shaped tube of the heat exchanger matingly engage apertures 40 of the manifold. An end plate 62 completes the assembly. Solder joints are formed at the flared end 42 of each aperture to ensure a leak-free, secure joining of the manifold to the U-shaped tube ends. The manifold may be joined to the heat exchanger in any of a number of known processes such as by vacuum brazing or welding the manifold thereto.

Alternatively, and as described in U.S. Pat. No. 5,190,101, assigned to the assignee of the present invention, the disclosure of which, beginning at column 4, line 58, et. seq. is hereby incorporated by reference, a second embodiment of the present invention may include a different configuration of the plurality of fluid conducting passageways in the base member formed during the extrusion of the U-shaped channel member. The fluid conducting passageways can be extruded as tubular members projecting perpendicularly to the plane of the base member. The diameter of the tubular member must be less than the diameter of the free ends of the U-shaped tubes of the heat exchanger so that a nonleaking seal (by brazing or soldering) can be formed between the manifold and the U-shaped tubes. Each of the tubular members communicates with an interior volume of the fluid conducting members. This allows fluid to pass from the fluid conduits through the fluid conducting passageway and into the U-shaped tubes.

In view of the above, variations and modifications to the present invention will no doubt occur to those skilled in the art. For example, the method of manufacturing the manifold from a single extruded piece of aluminum can also be performed for a single manifold as well as a double manifold. Various other materials may also be chosen to fabricate the manifolds and the present invention is not meant to be limited solely to those specified above. It is the following claims, including all equivalents which define the scope of our invention.

What is claimed is:

1. A method of making a manifold for a heat exchanger, comprising the steps of:

extruding a piece of plastically deformable material into a longitudinal U-shaped channel having a generally planar base member and a pair of vertically depending walls projecting generally perpendicularly to the plane of said base member;

forming a plurality of fluid conducting passageways in said base member;

rolling said vertical walls toward the longitudinal center of said base member until the free ends of said walls contact said base member so as to form a pair of hollow longitudinal fluid conduits; and forming a baffle in at least one of the longitudinal fluid conduits by plastically deforming a top wall of at least one of said fluid conduits until said top wall abuts a bottom wall of said fluid conduit and bonding said top wall to said bottom wall thereat, said step including providing a slit in said top wall and causing a bonding material to flow therethrough.

2. A method according to claim 1, wherein the step of extruding a longitudinal U-shaped channel further includes the steps of forming a U-shaped slot in said base member of said channel and forming an inwardly extending flange disposed on each of said vertical walls a predetermined distance from said base member.

3. A method according to claim 2, wherein the step of providing a slit in the top wall of said fluid conduit includes the step of forming a plurality of slits in the vertical walls at predetermined locations.

4. A method according to claim 3, wherein the step of rolling said vertical walls until the free ends thereof contact said base member further includes the step of rolling said vertical walls so that said free ends matingly engage said U-shaped slot formed in said base member and until said inwardly extending flanges contact said base member.

5. A method according to claim 4, wherein the step of forming a baffle in at least one of said fluid conduits includes the step of contacting said slits with a punch and applying a pressure thereagainst so as to plastically deform the top wall of the conduit against the bottom wall of the conduit.

6. A method according to claim 1, wherein the step of providing a slit in the top wall of said fluid conduit includes the step of applying a punch against the top wall of the conduit, the punch having a slit producing member disposed on the end thereof which contacts the top wall.

7. A method according to claim 1, wherein the step of forming a plurality of fluid conducting passageways includes the step of punching a plurality of apertures of predefined shaped in a predefined configuration in said base member.

8. A method according to claim 1, wherein the step of forming a plurality of fluid conducting passageways includes the step of extruding a plurality of tubular members from said base member.

9. A method according to claim 1, further including the step of sealing each of said fluid conduits along both a longitudinal axis between said fluid conduits and along both transverse ends of said conduits.

10. A method according to claim 1, further including the step of forming a plurality of inlet and outlet ports on said pair of fluid conduits.

11. A method of making a manifold for a heat exchanger, comprising the steps of:

extruding a piece of plastically deformable material into a longitudinal U-shaped channel having a generally planar base member and a pair of vertically depending walls projecting generally perpendicularly to the plane of said base member;

forming a longitudinal U-shaped slot in said base member of said channel generally parallel to the longitudinal axis of said base and forming an inwardly extending flange disposed on each of said vertical walls a predetermined distance from said base member;

forming a plurality of slits in the vertical sidewalls at predetermined locations;

punching a plurality of apertures of predefined shape in a predefined configuration in said base member to form a plurality of fluid conducting passageways in said base member;

rolling said vertical walls toward the longitudinal center of said base member so that the free ends of said vertical walls matingly engage said U-shaped slot formed in said base member and until said inwardly extending flanges contact said base member to form a pair of hollow longitudinal fluid conduits;

forming a baffle in each of longitudinal fluid conduits by applying a punch under pressure to plastically deform a top wall thereof at the slit until said top wall abuts a bottom wall of said fluid conduit and bonding said top wall to said bottom wall thereof; and sealing each of said fluid conduits along both a longitudinal axis between said fluid conduits and along both transverse ends of said conduits.

12. A method of making a manifold for a heat exchanger, comprising the steps of:

extruding a piece of plastically deformable material into a longitudinal U-shaped channel having a generally planar base member and a pair of vertically depending walls projecting generally perpendicularly to the plane of said base member;

forming a longitudinal U-shaped slot in said base member of said channel generally parallel to the longitudinal axis of said base and forming an inwardly extending flange disposed on each of said vertical walls a predetermined distance from said base member;

punching a plurality of apertures of predefined shape in a predefined configuration in said base member to form a plurality of fluid conducting passageways in said base member;

rolling said vertical walls toward the longitudinal center of said base member so that the free ends of said vertical walls matingly engage said U-shaped slot formed in said base member and until said inwardly extending flanges contact said base member to form a pair of hollow longitudinal fluid conduits;

forming a baffle in each of longitudinal fluid conduits by applying a punch having a slit forming member disposed on an end thereof under pressure to plastically deform a top wall of the conduits and form a slit until said top wall abuts a bottom wall of said fluid conduit;

bonding said top wall to said bottom wall of the conduits by causing a brazing material to flow through said slit and between said top and bottom walls; and sealing each of said fluid conduits along both a longitudinal axis between said fluid conduits and along both transverse ends of said conduits.

* * * * *